No. 756,653. PATENTED APR. 5, 1904.
H. H. KIFFE.
FISHING REEL.
APPLICATION FILED SEPT. 21, 1903.
NO MODEL.
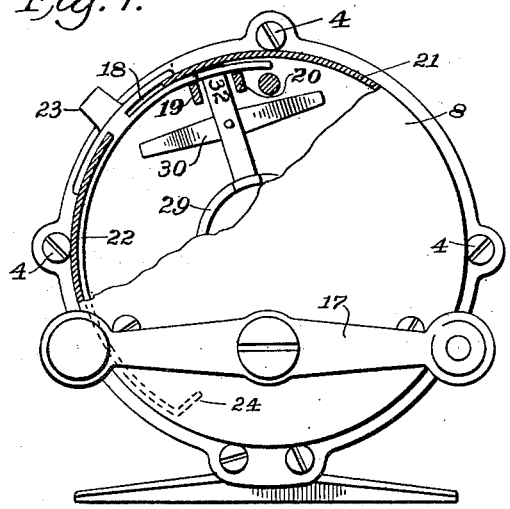
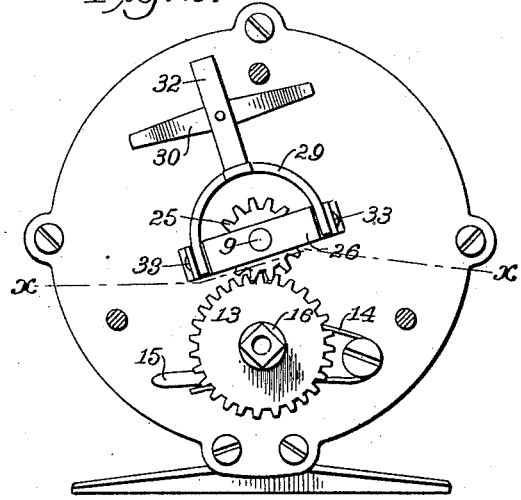
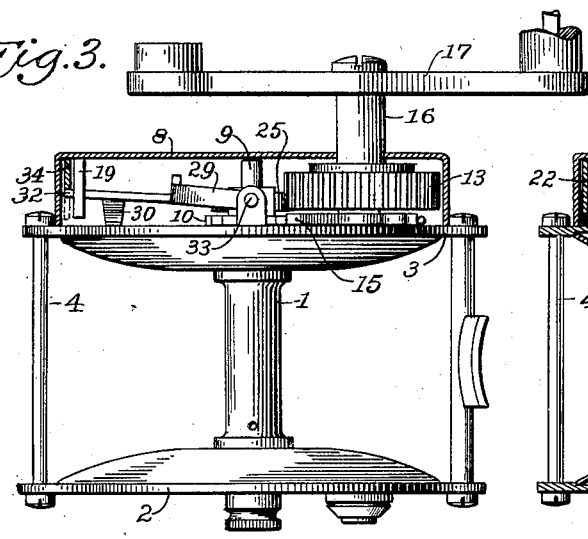
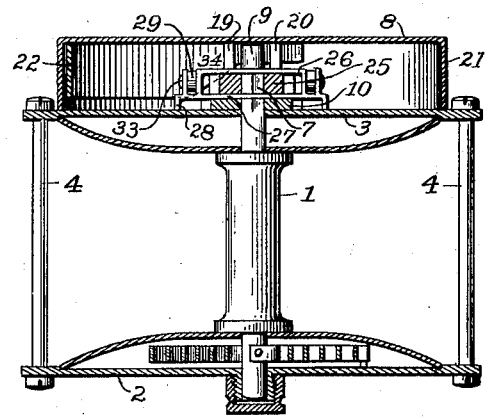
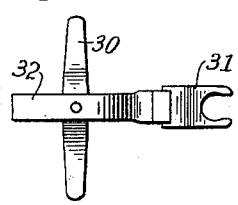
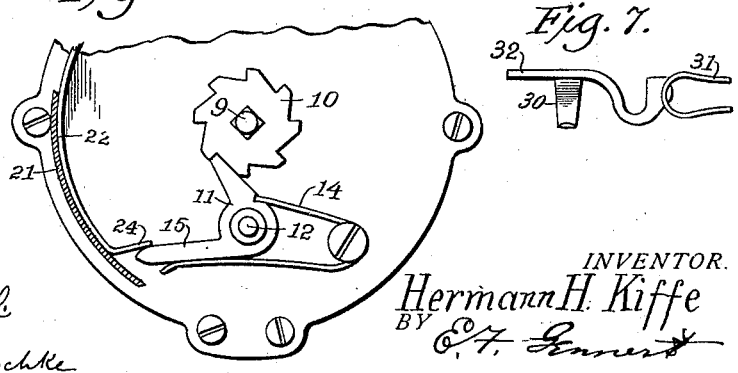
WITNESSES:
James F. Duhamel
William A. Hoschke
INVENTOR.
Hermann H. Kiffe
BY
ATTORNEY.
THE NORRIS PETERS CO., PHOTO-LITHO., WASHINGTON, D. C.

No. 756,653. Patented April 5, 1904.

UNITED STATES PATENT OFFICE.

HERMANN H. KIFFE, OF NEW YORK, N. Y.

FISHING-REEL.

SPECIFICATION forming part of Letters Patent No. 756,653, dated April 5, 1904.

Application filed September 21, 1903. Serial No. 173,959. (No model.)

*To all whom it may concern:*

Be it known that I, HERMANN H. KIFFE, a citizen of the United States, and a resident of the city, county, and State of New York, have invented certain new and useful Improvements in Fishing-Reels, of which the following is a specification.

My improvement relates to fishing-reels, the object being to produce an effective and cheap reel by which a fisherman can by a single movement throw the spool in or out of contact with the gear-wheel controlled by the handle and simultaneously operate a simple mechanism which, while permitting the line to run out freely, will prevent a backlashing or backward winding.

My improvement is fully shown in the accompanying drawings, in which—

Figure 1 is an end view of my improved reel, the case being partly broken away to show the peripheral flange in section and the connection between the outer and inner mechanism. Fig. 2 is a similar view, the case being removed. Fig. 3 is a side view, the gear-case being shown in section. Fig. 4 is an inverted plan view shown in section on line X X of Fig. 2. Fig. 5 is an end view showing the train of gears and fork removed, so as to expose the ratchet-wheel, the pawl, and its operating means. Fig. 6 is a plan view of a modified fork, and Fig. 7 is a side view of the same.

Similar reference-numbers indicate similar parts in the several views.

The fishing-reel is of conventional construction, being provided with a spool 1, which revolves in the case 2 3, the rods 4 serving to hold the case together. The spindle of the spool is provided with a square part 7, which extends a short distance up into the gear-case 8. Above the squared part it is round, as at 9, in cross-section, the diameter being equal in size to the diameter through the square part.

A ratchet-wheel 10 is placed on the square part of the spindle. A two-armed pawl 11 is mounted on a stud 12, upon which stud the large gear-wheel 13 also revolves, the gear-wheel being fastened to the shaft 16, which is bored out to suit. A spring 14 presses against the free arm 15 of the pawl. The handle 17 is removably fastened on the shaft 16 by means of a squared part and screw in the usual manner. The gear-case 8 is provided with two fingers 19 20, which extend down into the case near the peripheral flange 21, which is pierced with a slot 18 near the said two fingers to permit the articulation of a segmental strip 22. This strip is placed within the case and has a boss 23, by which it is moved. The lower end of the strip is bent inward, as at 24, so as to engage and raise the pawl 11 when the strip is pushed down to its limit. (See Fig. 1.)

In Fig. 5 the strip 22 is pushed up and the pawl is free to act. At the upper end the strip is beveled off edgewise, so as to form an incline, as shown in Figs. 3 and 4, for the purpose more fully hereinafter described.

A pinion 25 is mounted on the spool-spindle. This pinion is provided with a square hole of a suitable size to fit said spindle and is held in a guide-case formed of two flat parallel strips 26 27 bent down at each end and secured together, the lower bends 28 forming legs of proper length. This guide-case is fastened, by means of a shouldered rivet 33 at each end, to a forked lever 29, said lever having flat spring-legs 30 fastened to it at right angles near its free end 32, these legs forming a fulcrum-point. The free end of said lever is placed between the two fingers 19 20, which prevents the lever from moving radially when the inclined section of the segmental strip engages it.

In Figs. 6 and 7 I show a simple form for moving the pinion 25 in and out of operative connection with the spool, the two fingers 31 (formed of a single piece) taking the place of the flat guide-case to which I have referred.

The ratchet-wheel and spring in the lower case of the reel (shown in Fig. 4) is common and forms no part of this invention.

Such being the construction, the operation is as follows: To wind up the spool, push the boss 23 down to its full limit, Fig. 1. This movement presses the pinion down on the square shoulder of the spool-spindle and simultaneously raises the pawl away from its contact with the ratchet-wheel. In casting, press the boss 23 upward by the thumb, thereby moving the pinion away from the square part of the spindle. The spool will run free, the upward movement of the boss simultaneously releasing the pawl 11 and permitting it to act on the ratchet-wheel 10, whereby a backward winding is prevented.

All the mechanism is confined in the gear-case, which is easily opened, if required, and if the boss 23 is made quite small or in the shape of a lateral rib there are no projections or buttons to catch the line or clothing to interfere with the proper casting of the line.

Having fully described my invention, what I claim as new, and desire to secure by Letters Patent, is—

1. In a fishing-reel, the combination with the spool having its spindle formed with a square portion, of a ratchet-wheel fixed on said spindle, a pawl normally engaging said ratchet-wheel, a pinion slidably mounted on said spindle and having a square aperture to receive the squared portion thereof, means engaging said pinion for operating the same, and simultaneously actuating said pinion and pawl.

2. In combination with the spool and spindle thereof having a squared portion, a fixed ratchet-wheel carried by said spindle, means for rotating said spindle including a pinion adapted to engage the squared portion of said shaft, and a rounded portion to one side thereof, a pawl normally engaging said ratchet-wheel, and means for moving said pawl away from its wheel simultaneously with the moving of said pinion onto the squared portion of the spindle.

3. In a fishing-reel, a spool having its spindle extended, means for rotating said spool including a member adapted to be alternately fixed and loosely mounted on the spindle thereof, a lever in which said member is mounted, a ratchet-wheel fixed on said spindle, a pawl, and a member coöperating with said pawl and lever for actuating the said lever and pawl simultaneously.

4. In combination with the spool and the spindle thereof having a squared portion, a pinion slidably mounted on said spindle and normally engaging the squared portion thereof, means for moving said pinion, a large pinion meshing with the first-named pinion, means for preventing backward movement of said spindle, and means for throwing said last-named means into operation simultaneously with the moving of the first-named pinion from the squared portion of the spindle.

5. In combination with the spool and the spindle thereof, a pinion slidably mounted on said spindle, means for engaging the pinion with and disengaging it from the spindle, a large pinion meshing with the first-named pinion, means for actuating said last-named pinion, a ratchet-wheel fixed on said spindle, a spring-pressed pawl normally engaging said wheel, an operating-strip having one of its ends engaging said pawl, the other end of said strip having its edge beveled, and fingers secured to the gear-case and projecting on opposite sides of said lever, substantially as described.

Signed at New York, in the county of New York and State of New York, this 19th day of September, A. D. 1903.

HERMANN H. KIFFE.

Witnesses:
CHAS. P. ALBEE,
ALEXANDER C. BURNHAM.